US006363178B1

United States Patent
Chiba et al.

(12)

(10) Patent No.: US 6,363,178 B1
(45) Date of Patent: *Mar. 26, 2002

(54) DOCUMENT IMAGE DATA STORING AND CONTROLLING SYSTEM FOR SAVING STORAGE DATA

(75) Inventors: Hirotaka Chiba; Kenichiro Sakai; Tsugio Noda, all of Kanagawa (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,804

(22) Filed: Mar. 17, 1998

(30) Foreign Application Priority Data

Sep. 22, 1997 (JP) ............................... 9-256549

(51) Int. Cl.⁷ ................................. G06K 9/54
(52) U.S. Cl. ..................... 382/305; 382/298; 358/403; 358/453
(58) Field of Search ................. 382/305–306, 382/309–311, 298–299, 232, 173, 176; 358/403, 404, 406, 452–453, 462; 707/1–6, 500, 530, 516; 345/202, 555, 803, 428, 605, 543

(56) References Cited

U.S. PATENT DOCUMENTS 5,457,776 A * 10/1995 Wong et al. ............... 707/516
5,703,628 A * 12/1997 Nishiyama ................. 345/543
5,880,728 A * 3/1999 Yamaashi et al. ........... 345/803
6,005,679 A * 12/1999 Haneda ...................... 358/453

FOREIGN PATENT DOCUMENTS

| JP | 4-130582 | 5/1992 | ........... G06F/15/62 |
| JP | 4-175875 | 6/1992 | ........... G06F/15/04 |
| JP | 6-86031 | 3/1994 | ........... H04N/1/121 |
| JP | 8-212306 | 8/1996 | ............. G06F/9/68 |

* cited by examiner

Primary Examiner—Leo Boudreau
Assistant Examiner—Ishrat Sherali
(74) Attorney, Agent, or Firm—Armstrong, Westerman & Hattori, LLP

(57) ABSTRACT

A document image data storing and controlling system including a document image data storing unit for storing document image data as partial image data which are areas divided according to the attributes such as a text, a graphic, a table, etc.; and a document image data rewriting unit for reducing the amount of the document image data by deleting the partial image data whose degree of importance of information is low, or by lowering its resolution in the document image data. By employing this system, for example, in a portable storage device whose storage amount is limited, a storage amount for new data can be secured while leaving effective information of the document image data.

2 Claims, 17 Drawing Sheets

| DOCUMENT NAME | DATA AMOUNT | CREATION DATE | UPDATE DATE | NUMBER OF REFERENCE TIMES | STORAGE TIME LIMIT | DELETION PROHIBITION | HIGHEST DELETION PRIORITY |
|---|---|---|---|---|---|---|---|
| DOCUMENT 1 | 30,000 | 10.05.96 | 12.12.96 | 10 | — | PROHIBITION | 4 |
| DOCUMENT 2 | 25,000 | 10.05.96 | 10.10.96 | 2 | 1.1.97 | — | 2 |
| DOCUMENT 3 | 34,100 | 10.05.96 | 10.05.96 | 1 | — | — | 3 |
| DOCUMENT 4 | 17,500 | 10.05.96 | — | — | — | — | 1 |

F I G. 5

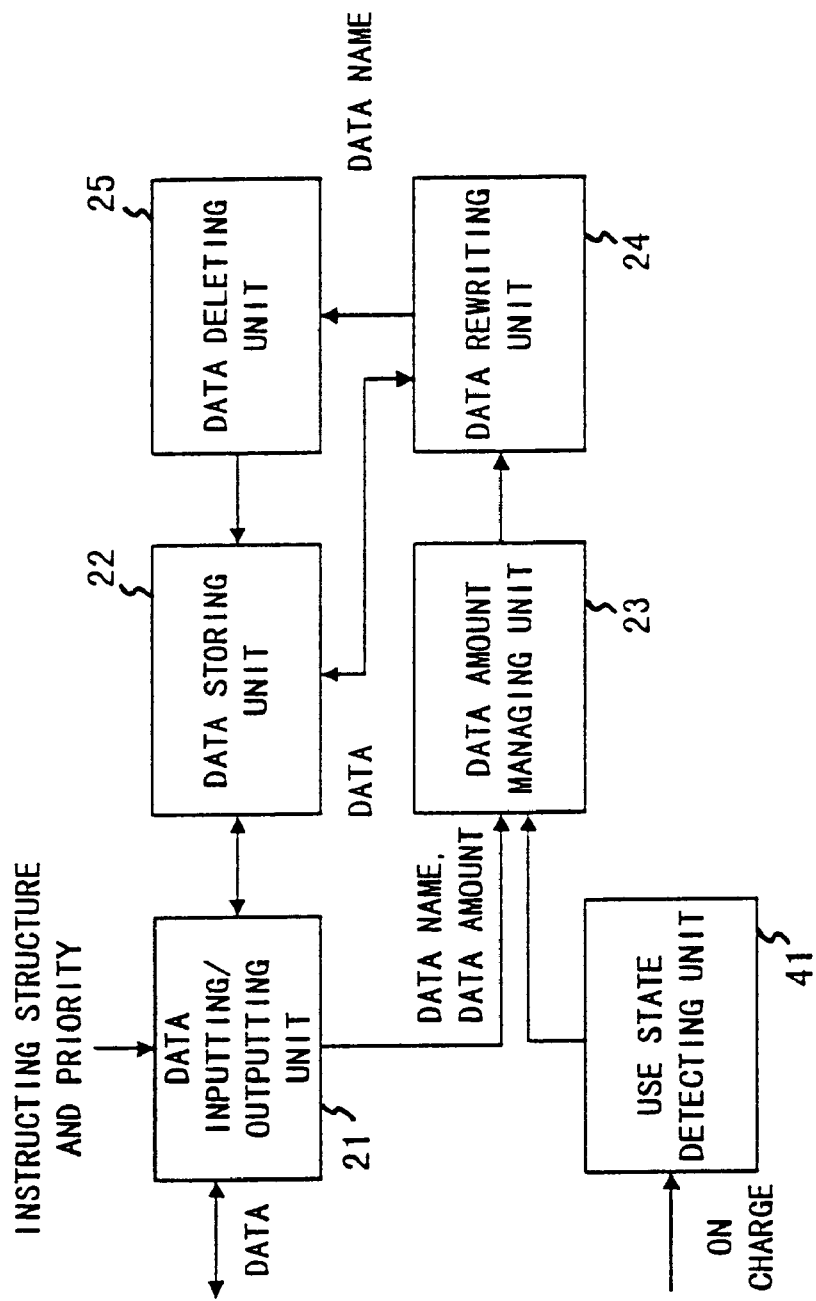
F I G. 14

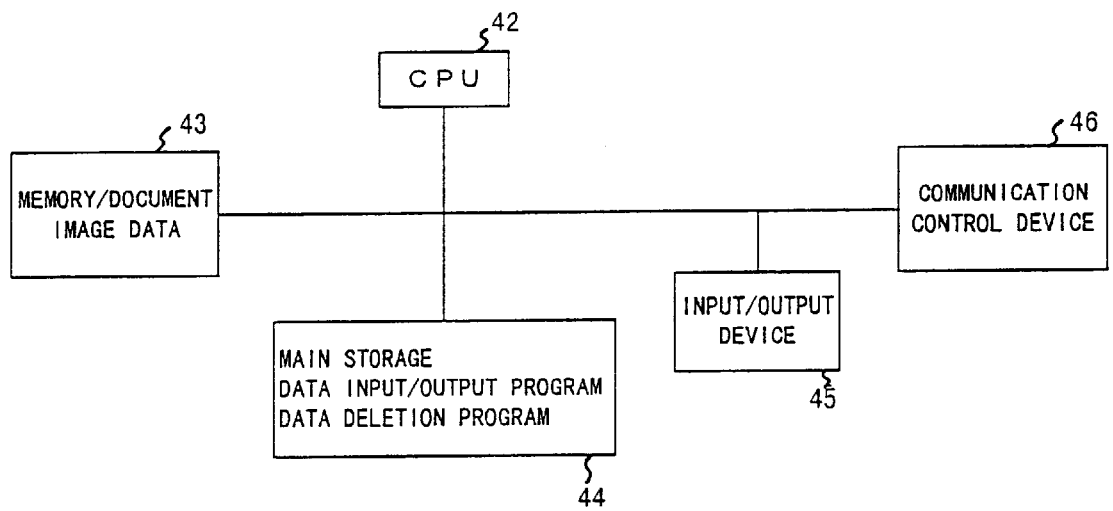
F I G. 16

DOCUMENT IMAGE DATA STORING AND CONTROLLING SYSTEM FOR SAVING STORAGE DATA

BACKGROUND OF THE INVENTION

1. Field of the Invention

The present invention relates to a document image data storing and controlling system, and more particularly to a document image data storing and controlling system for use in a storage device whose storage amount is limited, such as a portable storage device, etc.

2. Description of the Related Art

With the increasing popularity of PCs having higher performances and of input devices such as a scanner, etc. in recent years, application software for managing document image data by using PCs have become popular. With these application software, document image data is input to a PC and stored in a file, searched and displayed depending on need, thereby effectively using the document image data. Additionally, the progress of a character recognition technique or a structure recognition technique of document image data enables the document image data which is put into an electronic form to be character-recognized, so that it has become possible to save labor in inputting a document and in reusing the document.

Furthermore, the portable information devices available anywhere, to which addresses, telephone numbers, schedules, etc. of individuals, are input, have been widely used. As one type of such devices, a device for allowing the document image data of an electronic still camera or the document image data input from a facsimile modem via a telephone line to be stored, maintained, and generated, has emerged. There is the demand for inputting, searching, and referencing the document image data with such a portable dedicated device in a similar manner as with a desktop PC.

An amount of data of one piece of document image data is 10 to 100 times text data, even if it is compressed with a dedicated compression method (such as the MMR, etc.). This is really a huge amount. Document image data is used by desktop PCs in most cases. Since desktop PCs can use a storage device having a large amount of storage amount such as a magnetic disk, an optical disk, etc., almost no problem is posed in terms of the amount of a storage amount. The storage amount of a portable information device is much less than that of a desktop PC. Therefore, the amount of document image data that can be stored is very small.

Accordingly, if the document image data is handled with a portable information device, the storage amount soon becomes insufficient. Because a storage amount to which data can be newly input must be secured in such a case, the document image data in the storage area must be deleted.

Provided below is the explanation about a conventional data storing system for use in a storage device whose amount is limited, by referring to FIGS. 1 and 2. FIG. 1 is a block diagram exemplifying the configuration of a first conventional data storing system. This conventional example is disclosed by the following document 1.

Document 1: Japanese Patent Application (TOKUGANHEI) No. 1-242094 (Japanese Laid-open Patent Publication (TOKKAIHEI) No. 3-105558) Document Editing Device Inventor: Isao YAMAZAKI The first conventional system shown in FIG. 1 comprises a data input/output unit 1 for externally inputting/outputting data; a data storing unit 2 for storing data; a data amount managing unit 3 for managing an amount of stored data; a data deletion instructing unit 4 for instructing data deletion based on the output of the data amount managing unit 3; and a data deleting unit 5 for deleting the data stored in the data storing unit 2.

In FIG. 1, the amount of data stored in the data storing unit 2 is managed by the data amount managing unit 3. Assuming that a remaining storage amount is equal to or less than ten pages in terms of the number of pages of a document, for example, a user is made to specify the name of the document image data and a display process or a print process for that data. After the specified process is performed, all pieces of image data forming one document are deleted. The first conventional system secures a storage area in such a way.

FIG. 2 is a block diagram exemplifying the configuration of a second conventional system. This conventional system is disclosed by the following document 2.

Document 2: Japanese Patent Application (TOKUGANSHO) No. 63-219327 (Japanese Laid-open Patent Publication (TOKKAIHEI) No. 2-066654) Cache Memory Controlling System Inventor: Hiroaki HARA In FIG. 2, the amount of data stored in the data storing unit 2 is managed by the data amount managing unit 3 in a similar manner as in FIG. 1. If the storage amount becomes insufficient, for example, data to which fewer accesses are made is automatically deleted by a data deleting unit 6, thereby securing a storage area for new data.

As described above, a document image which was previously input must be deleted in a unit of an entire document each time document image data is newly input, so as to secure a new storage area when a storage amount draws near to its limitation. Accordingly, the conventional systems have a problem in that it is difficult to keep each document image data for a long period of time.

SUMMARY OF THE INVENTION

The object of the present invention is to provide a document image data storing and controlling system for automatically securing a storage area for new document image data while leaving effective information in each document image data for a long period, without merely deleting document image data.

An embodiment of the present invention provides a document image data storing and controlling system which comprises a document image data storing unit for storing document image data which is divided into partial image data; and a document image data rewriting unit for rewriting the document image data so as to reduce the amount of the partial image data forming the stored document image data. Generally, document image data includes the areas having the attributes such as a graphic, a table, a title, a text, etc. as the image data of a single page. According to the present invention, the division of the document image data into partial image data in the areas according to these attributes is called "structurization". With the document image data storing and controlling system according to the present invention, the partial image data having an attribute whose degree of importance as information is low is deleted, or the resolution of that partial image data is lowered in the document image data, thereby reducing the total amount of the document image data. Consequently, the storage area for new document image data can be secured while leaving effective information in previously stored document image data.

Another embodiment of the present invention provides a computer-readable storage medium for storing a program which is to be executed by a computer, and includes the steps of storing document image data structurized into partial image data, and rewriting the document image data in order to reduce the amount of the partial image data forming the stored document image data in order to control the storage of the document image data.

The document image data storing and controlling system which achieves the above described object of the present invention can be implemented also by making a computer read a program stored onto a storage medium, and execute the program.

A further embodiment of the present invention provides a document image data storing and controlling method comprising the steps of storing document image data structurized into partial image data, and rewriting the document image data in order to reduce the amount of the partial image data forming the document image data when the amount of the stored document image data reaches a predetermined amount. This method allows a storage area for new document image data to be automatically secured while leaving effective information in respective document image data.

BRIEF DESCRIPTION OF THE DRAWINGS

The present invention will be more apparent from the following detailed description, when taken in conjunction with the accompanying drawings, in which;

FIG. 5 exemplifies the structure of a document management information table;

FIG. 14 is a block diagram showing the configuration of a document image data storing and controlling system according to a fifth preferred embodiment;

FIG. 16 is a block diagram showing the configuration of a computer system implementing the document image data storing and controlling system according to the present invention.

DESCRIPTION OF THE PREFERRED EMBODIMENTS

Figure 1:
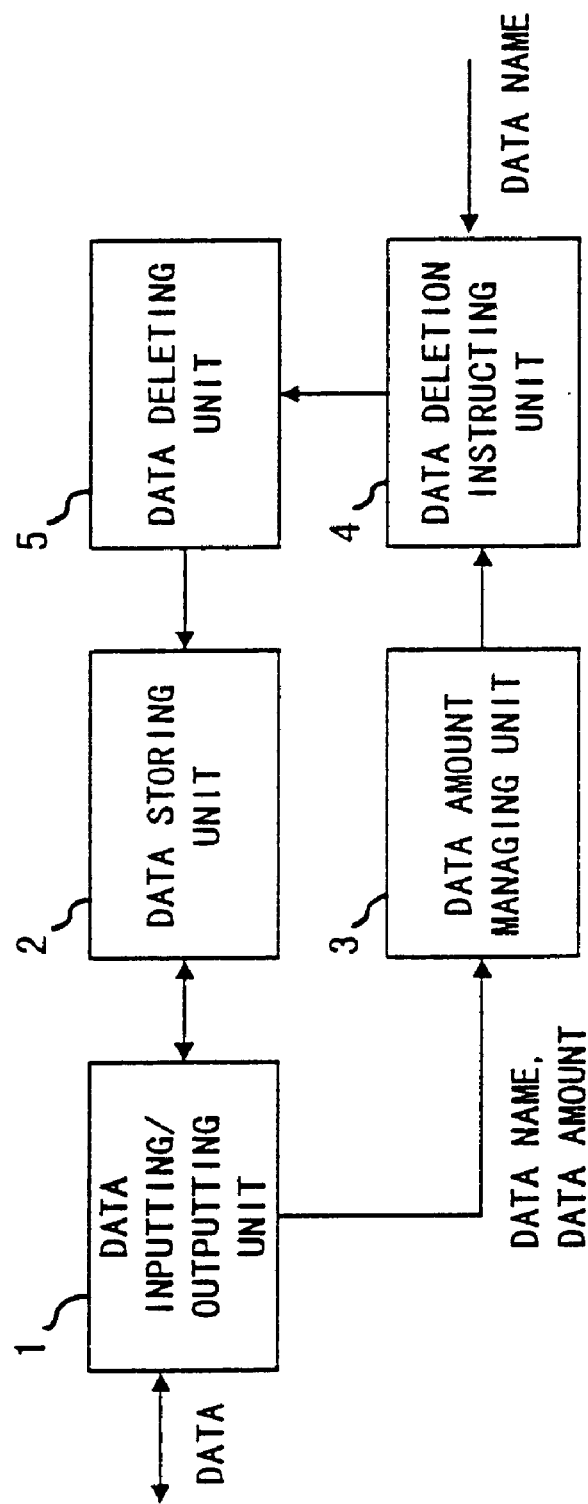
FIG. 1 is a block diagram exemplifying the configuration of a first conventional document image data storing and controlling system.
Figure 2:
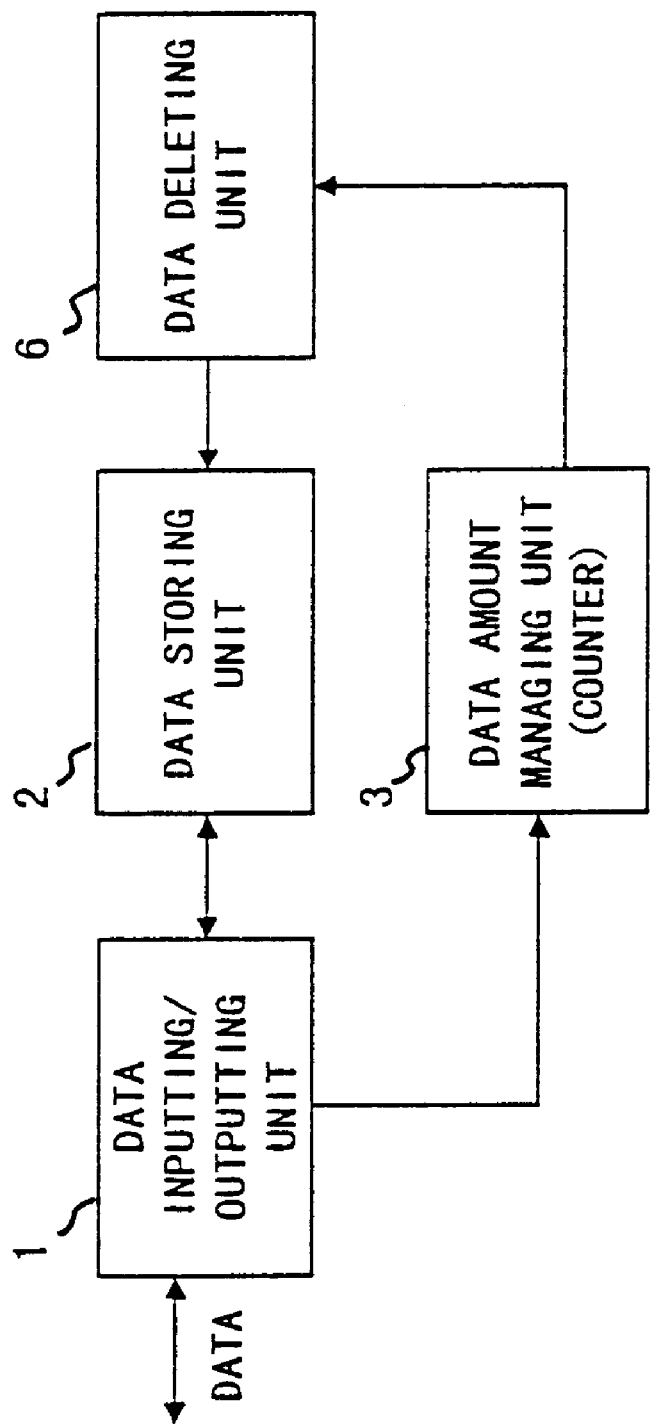
FIG. 2 is a block diagram exemplifying the configuration of a second conventional document image data storing and controlling system.
Figure 3:
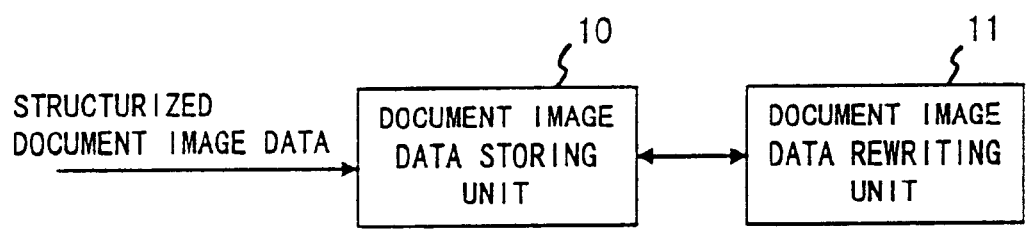
FIG. 3 is a block diagram showing the principle of the present invention.

FIG. 3 is a block diagram showing the principle of the present invention. This figure shows the principle of a document image data storing and controlling system for use in a storage device with a limited storage amount.

In this figure, a document image data storing unit 10 is intended to store document image data structurized into partial image data; and a document image data rewriting unit 11 is intended to reduce the amount of partial image data forming the document image data stored in the document image data storing unit 10, for example, in stages.

Unlike numeric value data and text data, document image data on one page can be normally structurized by dividing it into areas according to the attributes such as a graphic, a table, a title, a text, etc., that is, partial images. According to the present invention, image data is structurized based on, for example, an area instruction of partial image data, which is issued by a user, and stored in the document image storing unit 10.

As described above, any of the partial image data can be deleted according to the attributes of divided areas, that is, the partial images of the document image data structurized into the partial image data. The amount of stored data can be significantly reduced by preferentially deleting the partial image data whose degree of importance is low in the document image data, or lowering its resolution instead of deleting it, while leaving effective data unchanged. The document image data rewriting unit 11 deletes such partial image data, or lowers its resolution, thereby enlarging an area where data can be stored in the document image data storing unit 10.

To delete partial image data, for example, assigning a deletion priority to partial image data, and sequentially deleting partial image data having a higher value of the deletion priority, may be implemented as an embodiment of the present invention. Additionally, the amount of data may be reduced by lowering the resolution of partial image data in stages according to the value of a deletion priority.

The document image data is normally composed of bitmap data representing an actual image, and management information such as a document name, a creation date, etc. The document management information is effective for identifying document image data. Therefore, according to some of the preferred embodiments of the present invention, only the document management information is left to the end although partial image data (bitmap data) itself is deleted in stages, so that the amount of data can be significantly reduced and a key to a search for input document image data can be left. As a further preferred embodiment of the present invention, data can be rewritten, for example, according to a user request order by presetting the method for rewriting data, such as sequential deletion of partial image data based on deletion priorities, lowering of a resolution, or whether or not to leave document management information to the end, etc.

As described above, a new storage amount can be secured, for example, by performing a rewrite operation for reducing the amount of partial data divided according to attributes in stages, while leaving effective information in a document image, according to the preferred embodiments of the present invention.

Figure 4:
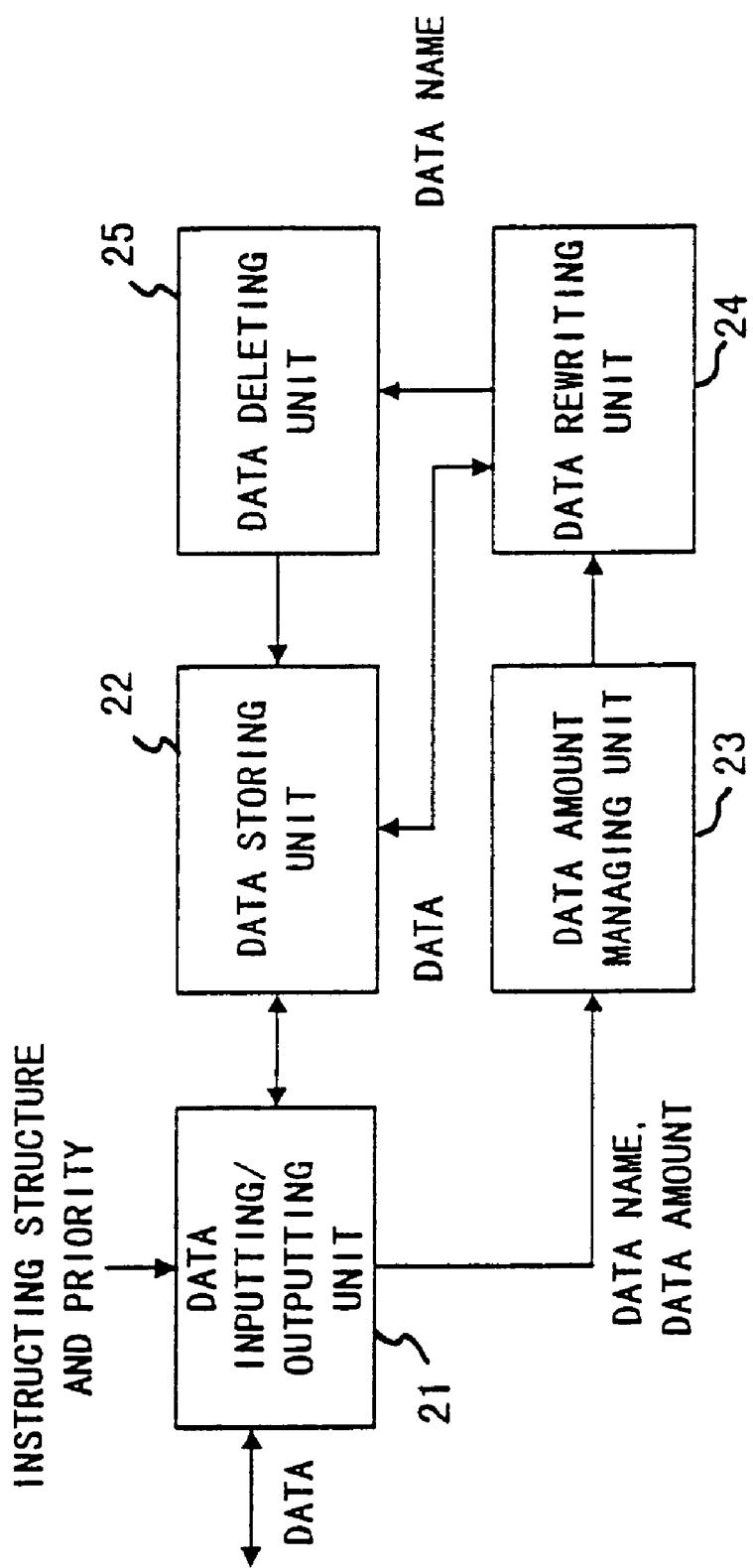
FIG. 4 is a block diagram showing the basic configuration of the document image data storing and controlling system according to the present invention.

FIG. 4 is a block diagram showing the configuration of the document image storing and controlling system according to the present invention. In this figure, the document image data storing and controlling system comprises a data input/output unit 21 for structurizing externally input document image data into partial image data, outputting the structurized partial image data to a data storing unit 22, and externally outputting the image data which is structurized and stored in the data storing unit 22; a data storing unit 22 for storing the structurized document image data, that is, the partial image data; a data amount managing unit 23 for managing an amount, a name, etc. of stored document image data; a data rewriting unit 24 for rewriting data so as to reduce the amount of partial image data stored in the data storing unit 22 when the amount of data stored in the data storing unit 22, for example, exceeds a certain value; and a data deleting unit 25 for deleting document management information stored in the data storing unit 22 in correspondence with bitmap data as an image.

Figure 7:
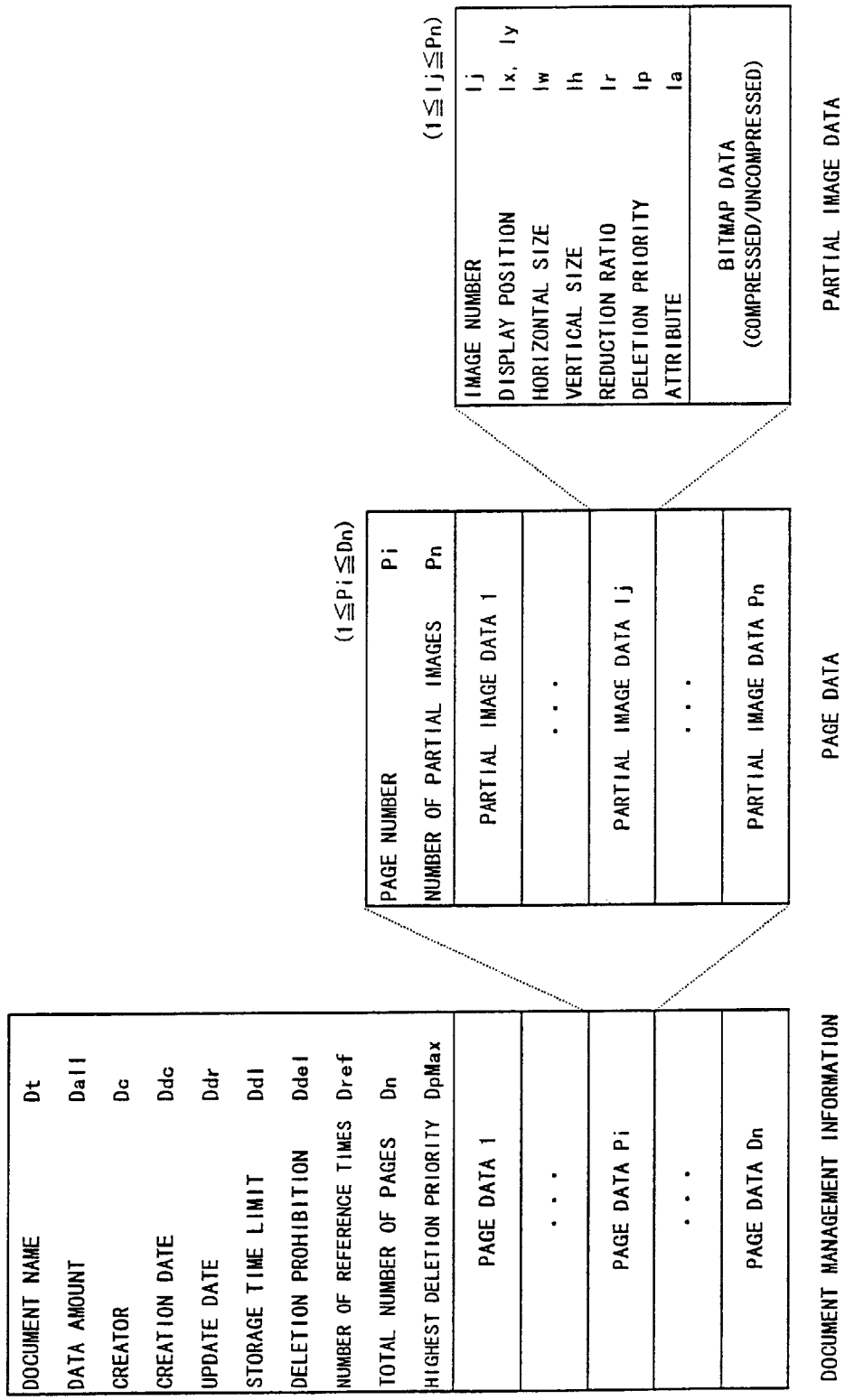
FIGS. 7A, 7B, and 7C show the formats of document image data stored in a data storing unit.

Normally, document image data is composed of actual bitmap data as an image, and document management information such as a document name, a creation date, etc. FIG. 5 exemplifies a document management information table. Although the document management information will be described later by referring to FIG. 7, major items of the document management information are listed in the form of a table. That is, the name, the amount of data, the creation date, the update date, the number of reference times, the storage time limit, etc. of each document are listed as the document management information. Additionally, this table includes deletion prohibition information, for example, if a user prohibits a document from being deleted. Furthermore, it includes a highest deletion priority, to be described later, for each document. FIG. 5 shows that the highest deletion priority is "4" and deletion is prohibited for a document 1. This means that the deletion prohibition is instructed, for example, by a user later.

The document management information explained by referring to FIG. 5 is managed by the data amount managing unit 23 shown in FIG. 4. The name, the amount, etc. of data to be input/output to/from the data storing unit 22 is provided from the data inputting/outputting unit 21 to the data amount managing unit 23. The data amount managing unit 23 manages data by rewriting each of the items of the document management information explained by referring to FIG. 5, that is, the amount of data, a creation date, an update date, the number of reference times, etc.

Unlike a natural image, a document image normally has a different meaning in each area. Each of the areas forming the document image can be classified according to the attributes such as a text, a graphic, a table, etc., and the attributes such as a caption indicating the source of a document, a title, a text, a footer indicating a page number of the source, etc. If a document image is searched or if its source is examined, it is sometimes sufficient only to obtain the information about one certain attribute of the document image. For example, if only a graphic is kept in memory and the document about that graphic is searched, only the areas having a graphic attribute are displayed and searched.

The structurization of a document image divides the document image into areas according to attributes such as a text, a graphic, a table, etc. It is also called layout recognition or area division. Although various types of structurization algorithms are known, the preferred embodiment assumes that the area instruction of partial image data is issued from a user, for the sake of convenience. The embodiment also assumes that a document image data to be input is displayed on a screen at a data input, and the document image data is structurized by being divided into partial image data according to a user's mouse operation.

Figure 6:
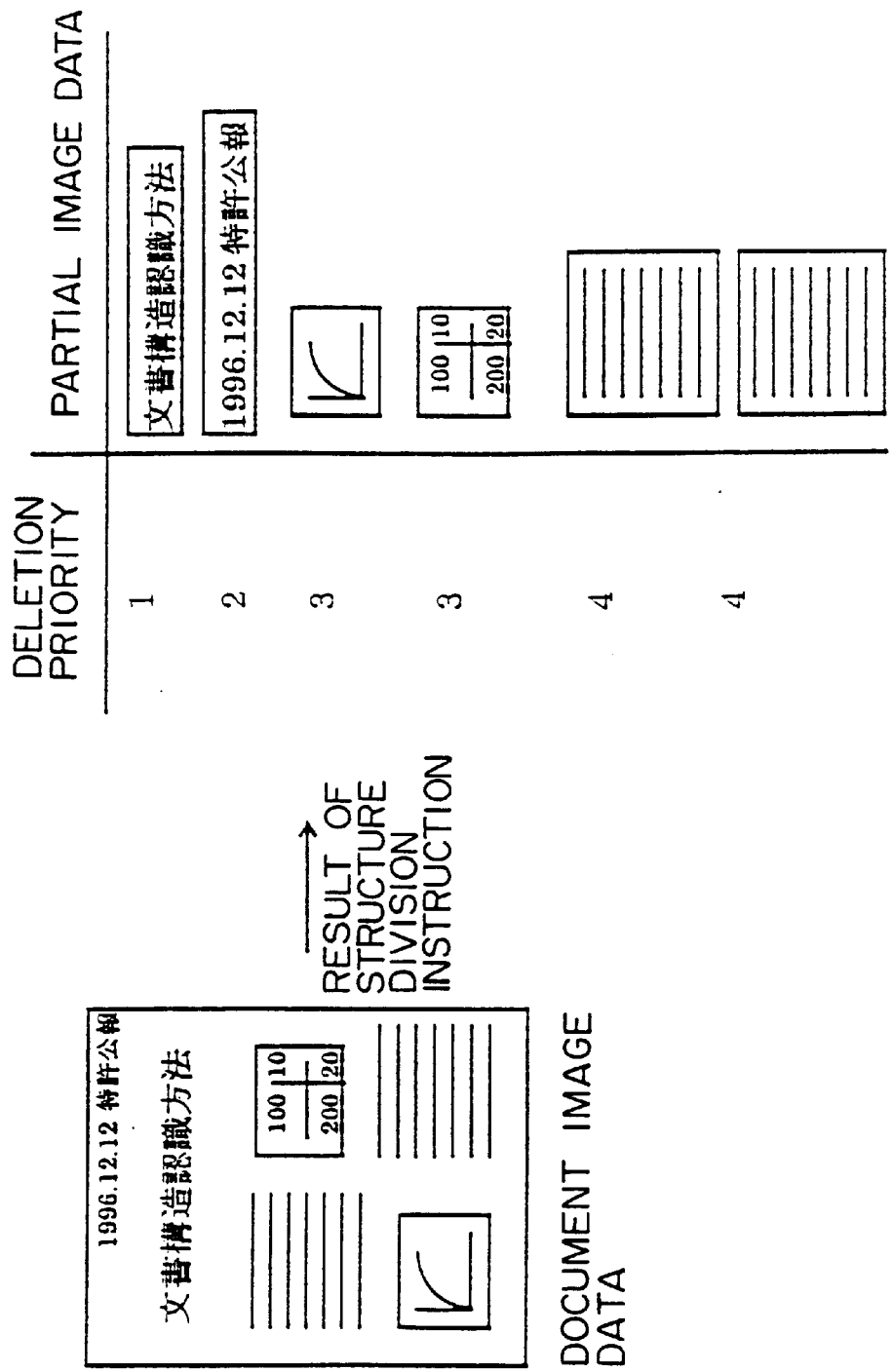
FIG. 6 is a schematic diagram exemplifying partial image data stored together with deletion priorities according to a structure division instruction.

FIG. 6 is a schematic diagram explaining such a process for structurizing document image data, that is, the process for dividing document image data into partial image data. In this figure, for example, the structure division instruction is issued by a user regarding the document image data displayed on a screen, and the document image data is structurized into a set of partial image data according to this instruction, as described above. At the same time, deletion priorities are instructed by the user, and assigned to the respective partial image data. The higher the deletion priority, the earlier the corresponding partial image data may be deleted.

FIGS. 7A, 7B, and 7C show the formats for storing the document image data which is divided into partial image data, and assigned with deletion priorities as shown in FIG. 6. FIG. 7A represents the document management information including the items such as a document name, the amount of data, a creator, a creation date, an update date, a storage time limit, existence/non-existence of deletion prohibition, the number of reference times, the total number of pages, and the highest deletion priority, as explained by referring to FIG. 5.

The highest deletion priority among the information items indicates the maximum value of the partial image data which is not deleted, but stored and left in the data storing unit 22, among the deletion priorities assigned to the respective partial image data corresponding to one document. For example, if the partial image data assigned with the deletion priority "4" among the partial image data referred to in the explanation of FIG. 6 have been deleted, and the maximum value of the deletion priorities of the partial image data left in the data storing unit 22 is "3", this is the highest deletion priority.

FIG. 7B shows page data. The page data is the data corresponding to each page in a document. It is composed of a page number, the number of partial images on a corresponding page, and partial image data of the corresponding page.

FIG. 7C shows partial image data. Each partial image data is composed of an image number indicating a number of a partial image on a page, the display position of the partial image, the horizontal and vertical sizes of the partial image (the number of pixels), the reduction ratio when a partial image is reduced and its resolution is lowered, a deletion priority, for example, instructed from a user to the partial image, an attribute, and bitmap data as actual image data. The bitmap data is, for example, raster-scanned data if it is uncompressed, while it is encoded data if it is compressed.

Figure 8:
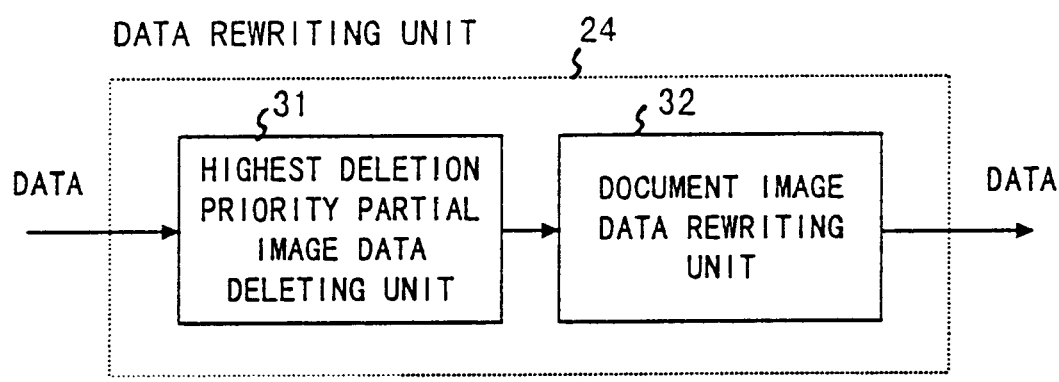
FIG. 8 is a block diagram showing the structure of a data rewriting unit according to a first preferred embodiment of the document image data storing and controlling system according to the present invention.

Provided next are further details of the explanations of the preferred embodiments according to the present invention. FIG. 8 is a block diagram showing the structure of the data rewriting unit 24 according to the first preferred embodiment of the present invention. According to the first preferred embodiment of the present invention, the data rewriting unit 24 shown in FIG. 4 has the structure shown in FIG. 8. In this structure, the data rewriting unit 24 is composed of a highest deletion priority partial image data deleting unit 31 and a document image data rewriting unit 32.

The highest deletion priority partial image data deleting unit 31 is intended to delete the partial image data having the maximum value of the deletion priorities among the partial image data which are not deleted and left in the data storing unit 22, according to the deletion priorities assigned to the respective image data into which the document image data is divided at its input, as referred to in the explanation of FIG. 6. If a plurality of pieces of document image data assigned with an identical deletion priority in the document image data are left, for example, the partial image data on a later page is selected and deleted earlier. The document image data rewriting unit 32 is intended to update each of the items of the document management information, which must be changed due to the deletion of partial image data, such as the amount of data, the highest deletion priority, etc.

Provided first is the outline of the data deletion operation performed in the basic configuration shown in FIG. 4. The data amount managing unit 23 selects the document having the maximum value of the highest deletion priority as a deletion target when the amount of data stored in the data storing unit 22 reaches a preset value. If a plurality of documents assigned with the identical highest deletion priority exist, for example, the document whose amount of data is larger is first selected. Then, a rewrite instruction is issued to the data rewriting unit 24 by targeting the selected document.

The data rewriting unit 2 performs the process for rewriting the selected document image data according to that instruction. If the partial image data assigned with the identical deletion priority exists in the document, the deletion operation is started, for example, from the last partial image data on a later page.

If all the highest deletion priorities are not "1", that is, if all the pieces of the partial image data in each document image data have been deleted, the data rewriting unit 24 selects the document whose creation date is older and issues the instruction for deleting the document management data to the data deleting unit 25, for example, according to the instruction issued from the data amount managing unit 23. The data deleting unit 25 deletes the document management data stored in the data storing unit 22 according to the instruction issued from the data rewriting unit 24.

Figure 9:
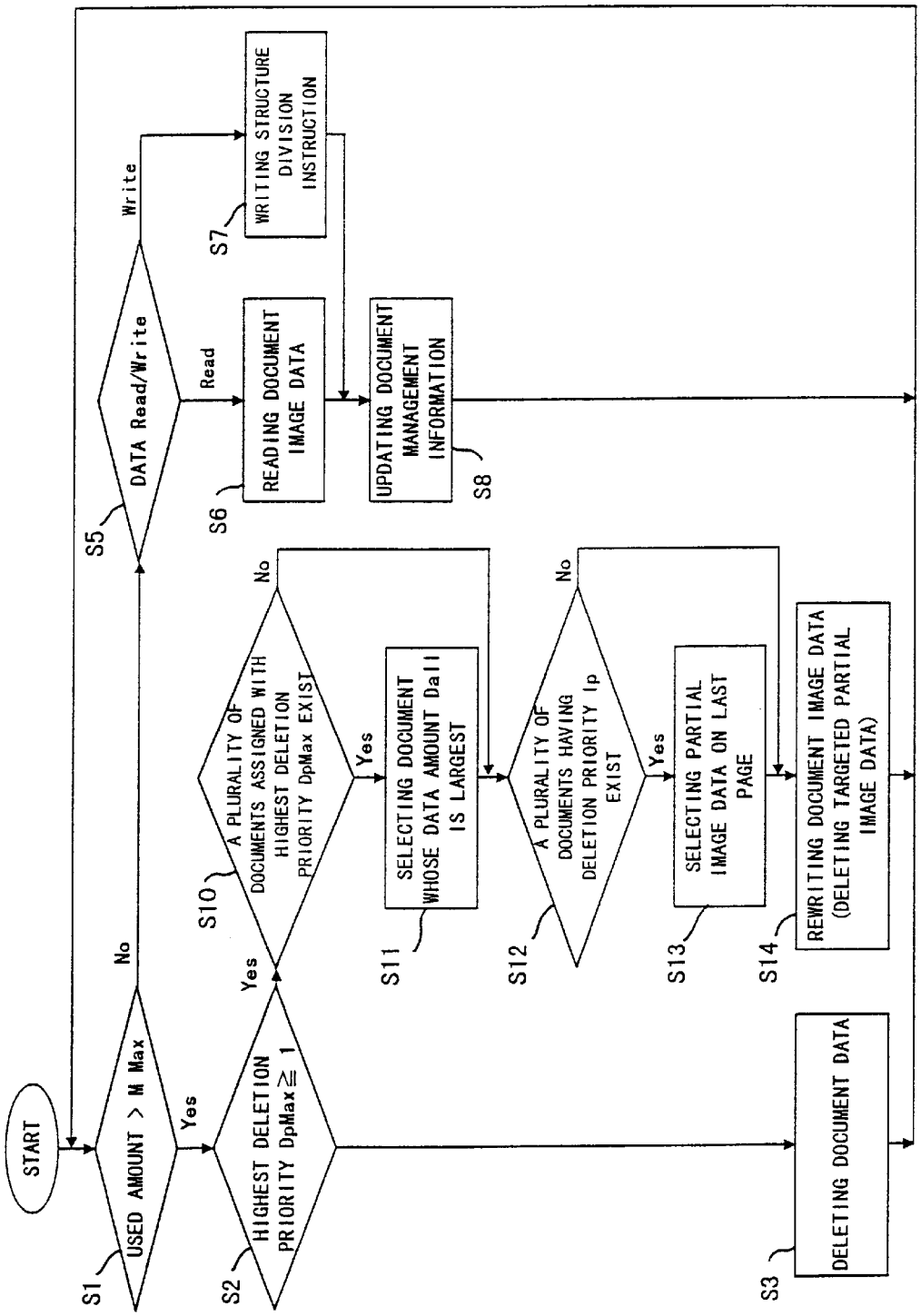
FIG. 9 is a flowchart showing the process for inputting and outputting data, and the process for rewriting data according to a first preferred embodiment.

FIG. 9 is a flowchart showing the process for inputting and outputting data, and the process for deleting data according to the first preferred embodiment shown in FIG. 8. Once the process is started in this figure, the data amount managing unit 23 determines whether or not the amount used by the data storing unit 22 exceeds a preset value of an MMax in step S1. If "NO", it is determined whether an attempted data operation is either a read operation or a write operation in step S5. If the attempted operation is determined to be the write operation, that is, an input operation, the data is written according to a user structure division instruction in step S7. In step S8, the document management information is updated, for example, by the data rewriting unit 24 according to the instruction issued from the data amount managing unit 23. Then, the process goes back to step S1. When the data is written, the document name, the amount of data, the creator, the creation date, the total number of pages, the highest deletion priority, etc. are stored.

If the attempted data operation is determined to be a read operation, that is, the output operation in step S5, the specified document image data is read out in step S6, and the document management information is updated in step S8. The process then goes back to step S1. The document management information updated when data is read out is, for example, the number of times that the data is referenced. If the used amount is determined to exceed the preset value in step S1, the process for rewriting data is performed. This rewrite process is performed based on the value of the highest deletion priority assigned to each document as described above. First of all, it is determined whether or not the value of the highest deletion priority of each document is equal to or greater than "1" in step S2. If "YES", it is determined whether or not a plurality of documents having the same value of the highest deletion priority exist in step S10. If "YES", the document with the largest amount of data is selected in step S11. If "NO", no operation is performed. Then, the process goes to step S12.

In step S12, it is determined whether or not a plurality of pieces of partial image data having one certain high value of the highest deletion priority exist in the selected document. If "YES", the partial image data on the last page is selected in step S13. If "NO", no operation is performed. Then, the process goes to step S14, where the partial image data corresponding to that deletion priority is deleted, and the document management information is rewritten. The process then goes back to step S1. As described above, the partial image data are deleted in stages according to deletion priorities in steps S10 through S14.

If it is determined that the value of the highest deletion priority is not equal to or larger than "1" in step S2, namely, if the deletion priorities assigned to all of the documents are "0", the document data, that is, the document management information, is deleted by the data deleting unit 25 in step S3. The process then goes back to step S1.

Here, the partial image data whose value of the highest deletion priority is larger is selected as a deletion target. However, the partial image data whose frequency of accesses is lower may be sequentially selected as a deletion target. The data rewriting unit 24 determines the frequency of accesses to a document within a predetermined time frame based on the data such as the number of reference times in the document management information, etc., deletes the partial image data whose frequency of accesses is lower, and rewrites the document management information.

Figure 10:
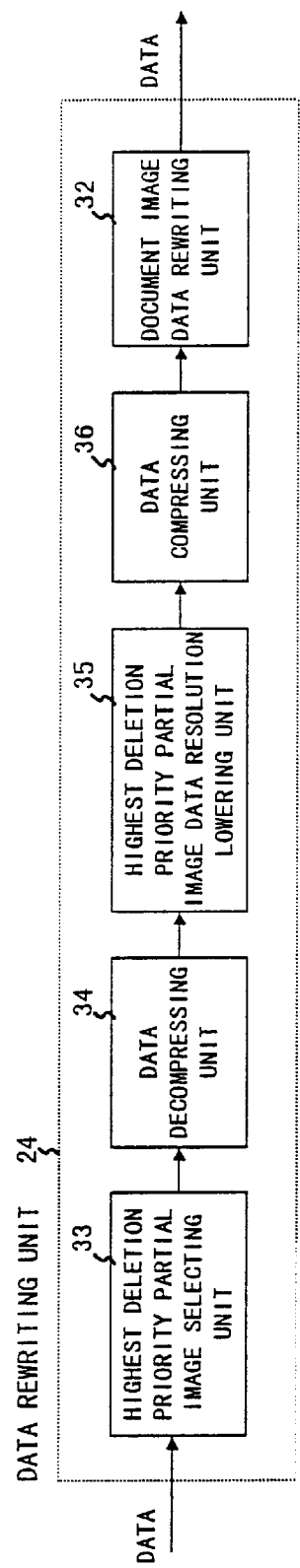
FIG. 10 is a block diagram showing the structure of the data rewriting unit according to a second preferred embodiment of the document image data storing and controlling system according to the present invention.

FIG. 10 is a block diagram showing the configuration of the data rewriting unit 24 according to the second preferred embodiment of the present invention. This figure depicts the details of the structure of the data rewriting unit 24 included in the basic configuration shown in FIG. 4. The difference between the structure shown in this figure and the structure according to the first preferred embodiment shown in FIG. 8 is that the data rewriting unit 24 includes a highest deletion priority partial image selecting unit 33, a data decompressing unit 34, a highest deletion priority partial image data resolution lowering unit 35, and a data compressing unit 36, instead of the highest deletion priority partial image data deleting unit 31.

If the document image data stored in the data storing unit 22 is not compressed with an arbitrary coding method, the data decompressing unit 34 and the data compressing unit 36 are not required. If the document image data is compressed, it is compressed and decompressed with an identical coding method such as the MMR (Modified Modified Relative Element Address Designate) used for a G4 facsimile, in the data decompressing unit 34 and the data compressing unit 36.

The highest deletion priority partial image selecting unit 33 selects partial image data in order to lower the resolution of the partial image data as referred to in the explanation of steps S10 through S13, instead of deleting the partial image data to be targeted in step S14 of FIG. 9. If the selected partial image data is compressed, it is decompressed by the data decompressing unit 34 and reduced by a preset reduction ratio, for example, 1/2, by the highest deletion priority partial image data resolution lowering unit 35.

With this process for lowering a resolution, the resolution of the partial image data is lowered, for example, from 400 dpi (dots per inch) to 200 dpi, by being sampled. After the reduced partial image data whose resolution is lowered is compressed by the data compressing unit 36, it is returned to the data storing unit 22 via the document image data rewriting unit 32. The document image data rewriting unit 32 rewrites the document management information which varies with the process for reducing partial image data, such as a data storage amount, a reduction ratio of partial image data, etc, in a similar manner as in the first preferred embodiment shown in FIG. 8. As a result, the rewrite process for lowering the resolution is terminated, and thereby the amount of data is reduced.

Figure 11:
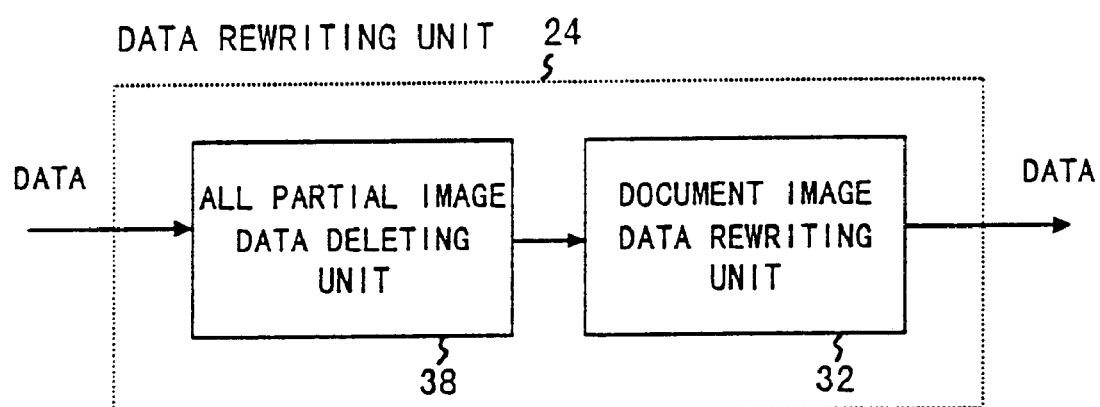
FIG. 11 is a block diagram showing the structure of the data rewriting unit according to a third preferred embodiment of the document image data storing and controlling system.

FIG. 11 is a block diagram showing the structure of the data rewriting unit 24 according to a third preferred embodiment. In this figure, the data rewriting unit 24 is composed of an all partial image data deleting unit 38 and a document image data rewriting unit 32. The all partial image data deleting unit 38 deletes all of bitmap data regardless of the deletion priorities of partial image data. The document image data rewriting unit 32 rewrites the document management information which varies due to the deletion of bitmap data. The all partial image deleting unit 38 may delete also the document management information at the last stage.

Figure 12:
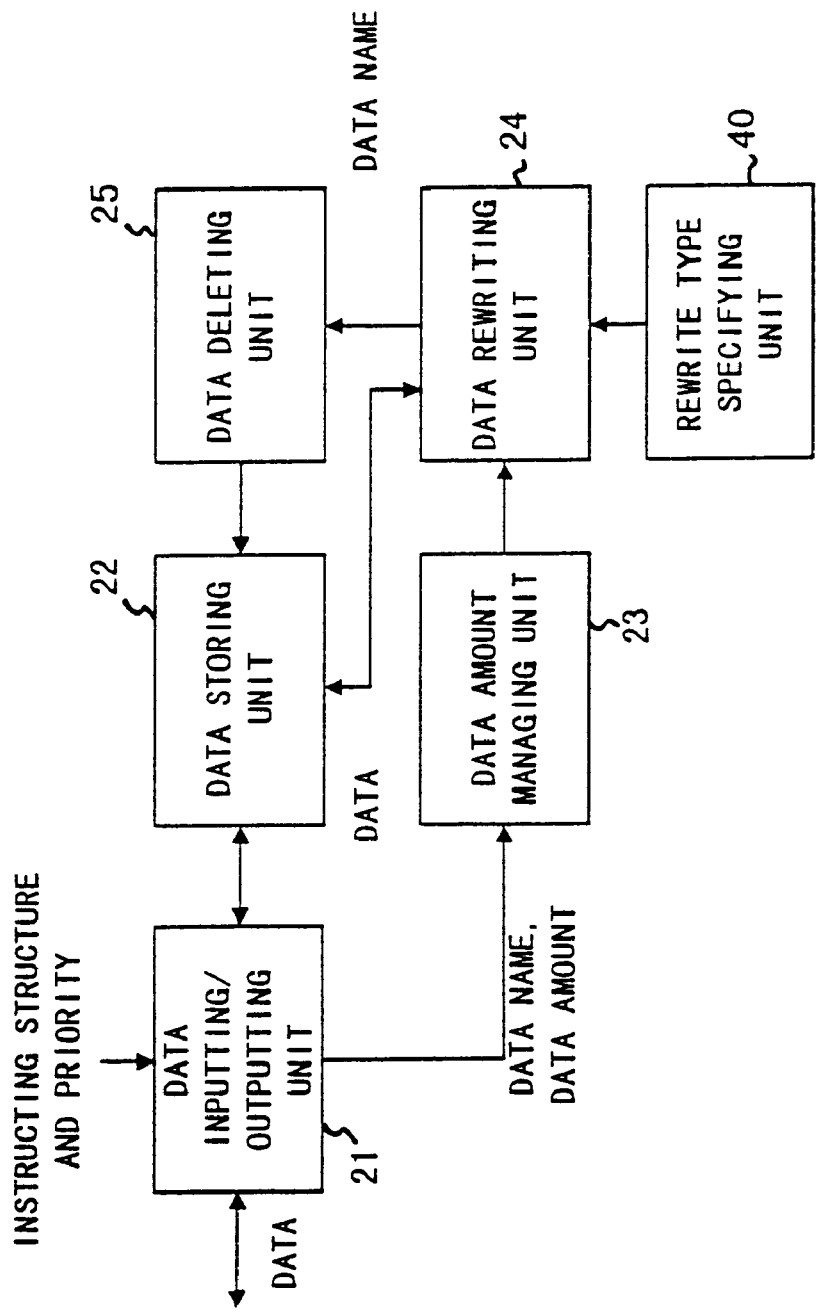
FIG. 12 is a block diagram showing the configuration of a document image data storing and controlling system according to a fourth preferred embodiment.

FIG. 12 is a block diagram showing the configuration of a document image data storing and controlling system according to a fourth preferred embodiment of the present invention. The difference between the configuration shown in this figure and the basic configuration shown in FIG. 4 is that a rewrite type specifying unit 40 for specifying a data rewrite type for the data rewriting unit 24 is included. The rewrite type specifying unit 40 is intended to instruct the data rewriting unit 24 of a data rewrite type, for example, in the first through third preferred embodiments, for example, according to user specification. By way of example, the method for rewriting data by initially lowering the resolution of partial image data, sequentially deleting partial image data, and lastly leaving only the management information, can be specified. With this method, data is rewritten in an order requested by a user.

Figure 13:
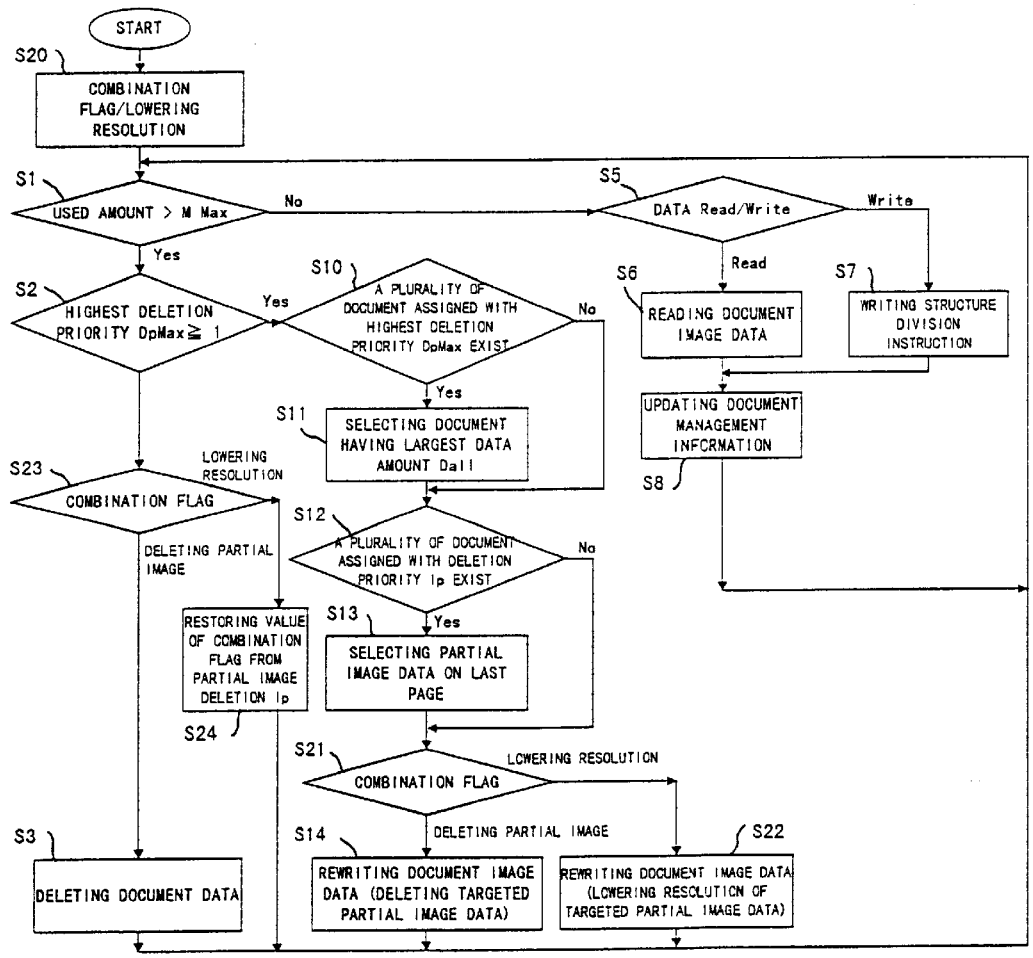
FIG. 13 is a flowchart showing the process for inputting and outputting data, and the process for rewriting data according to the fourth preferred embodiment of the document image data storing and controlling system.

FIG. 13 is a flowchart exemplifying the process for inputting/outputting data, and the process for deleting the data, which are performed in the fourth preferred embodiment shown in FIG. 12. This flowchart exemplifies the process for rewriting data by firstly lowering the resolution of partial image data, and sequentially deleting partial image data.

Provided below is the explanation about the process for rewriting data by focusing on the operations different from those of FIG. 9, with reference to FIG. 13. Once the process is started, a combination flag is set to a resolution lowering operation in order to firstly perform the process for lowering a resolution in step S20. Steps S1, S2, and S10 through S13 when data is deleted (rewritten) are similar to those of FIG. 9.

If partial image data to be targeted is selected in step S13, it is determined whether the content of the combination flag is either the resolution lowering operation or the partial image deletion operation in step S21. Since the combination flag is set to the resolution lowering operation in step S20, this operation is performed as the rewrite operation of document image data in step S22. The value of the deletion priority is set to "0" simultaneously with the rewrite operation of the reduction ratio of the partial image data. At the same time, the operation for maintaining the value of the deletion priority before being set to "0" is performed. If the highest deletion priority must be rewritten due to a change of the deletion priority, it is also updated. Then, the process goes back to step S1.

If the resolution lowering operation is performed for all pieces of partial image data, the highest deletion priority becomes "0" in step S2 and the process goes to step S23. It is determined whether the content of the combination flag is either the resolution lowering operation or the partial image deletion operation in step S23. Because the combination flag still indicates the resolution lowering operation here, the combination flag is set to a partial image deletion operation. Then, the value of the deletion priority "Ip" assigned to each partial image data is restored from "0" to the value before being set to "0", and generally, also the highest deletion priority is updated. The process then goes back to step S1. After that, the combination flag is determined to be the partial image deletion operation in step S21, and the partial image data is deleted in step S14 in a similar manner as in FIG. 9. After all of the partial image data, that is, all of the bitmap data, are deleted, the document data, that is, the document management information, is deleted in step S3 in a similar manner as in FIG. 9.

FIG. 14 is a block diagram showing the configuration of a document image data storing and controlling system according to a fifth preferred embodiment of the present invention. The difference between the configuration shown in FIG. 14 and the basic configuration shown in FIG. 4 is whether or not a document image storing device is used for the data amount managing unit 23, and a use state detecting unit 41 for providing the result of detection is included. If data is rewritten while the data is input/output, that is, read/written from/to the data storing unit 22, a data access fault occurs, which leads to the difficulty of use as a device.

As a result, the access state of the data storing unit 22 is measured and detected in a predetermined time period or longer during which no access is proved to be made. This result is provided from the use state detecting unit 41 to the data amount managing unit 23. When the amount of data stored in the data storing unit 22 reaches a predetermined amount or more, the data amount managing unit 23 instructs the data rewriting unit 24 to rewrite the data. The use state detecting unit 41 may detect an on-charge state where no access is explicitly made, and provide its result to the data amount managing unit 23.

Figure 15:
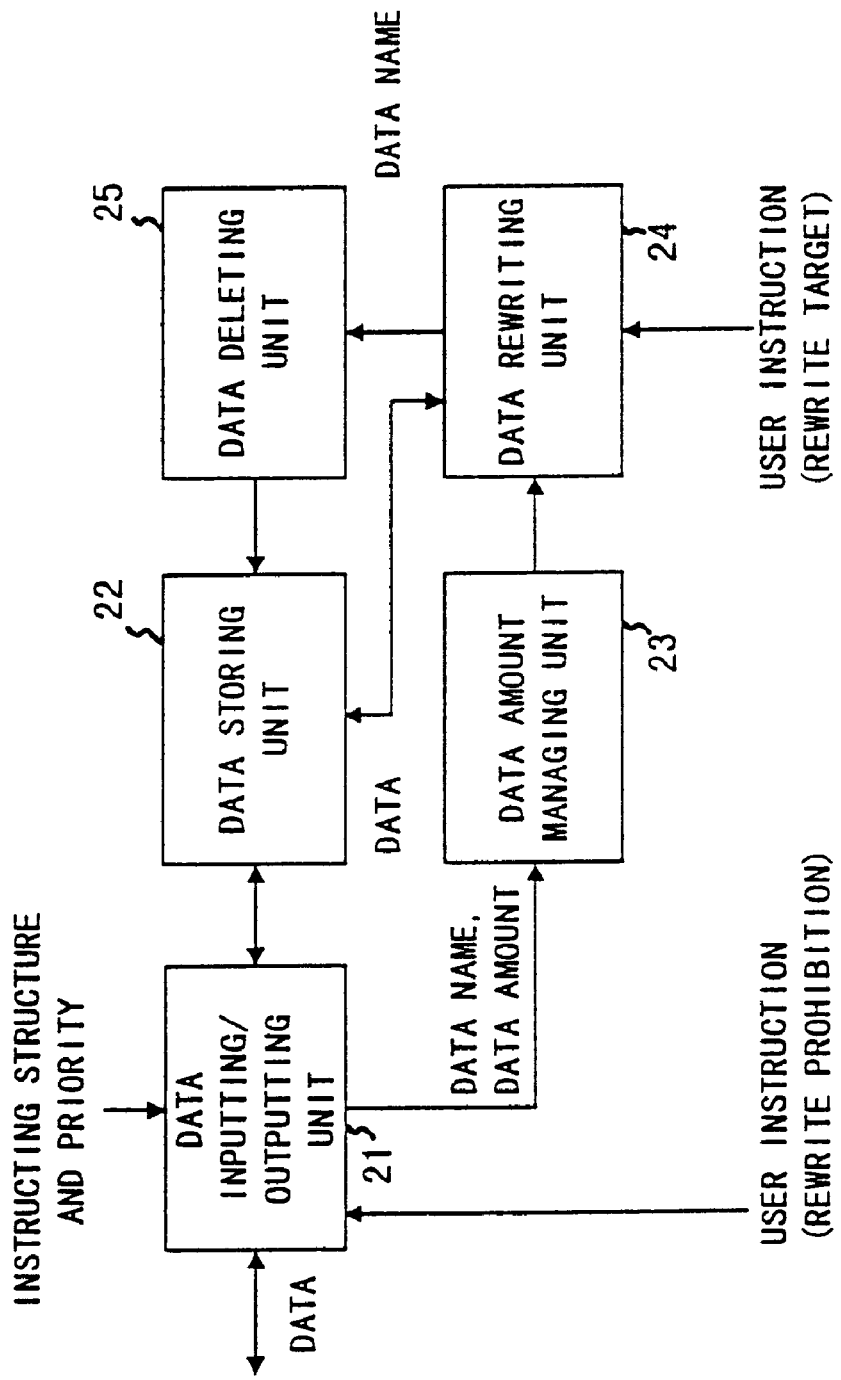
FIG. 15 is a block diagram showing the configuration of a document image data storing and controlling system according to a sixth preferred embodiment.

FIG. 15 is a block diagram showing the configuration of a document image data storing and controlling system according to a sixth preferred embodiment of the present invention. The entire configuration shown in FIG. 15 is similar to the basic configuration shown in FIG. 4. However, there are the differences that the instruction for prohibiting document image data from being rewritten can be input to the data inputting/outputting unit 21 as a user instruction, and that the document image data as a rewrite target can be input to the data rewriting unit 24 as a user instruction. Even if the user rewriting unit 24 selects the partial image data as a rewrite target, a user can specify also different partial image data as the rewrite target. Additionally, the user issues the instruction for prohibiting particular document image data from being rewritten when data is input by the data inputting/outputting unit 21, so that the input document image data can be always stored in the data storing unit 22 as it is.

Figure 17:
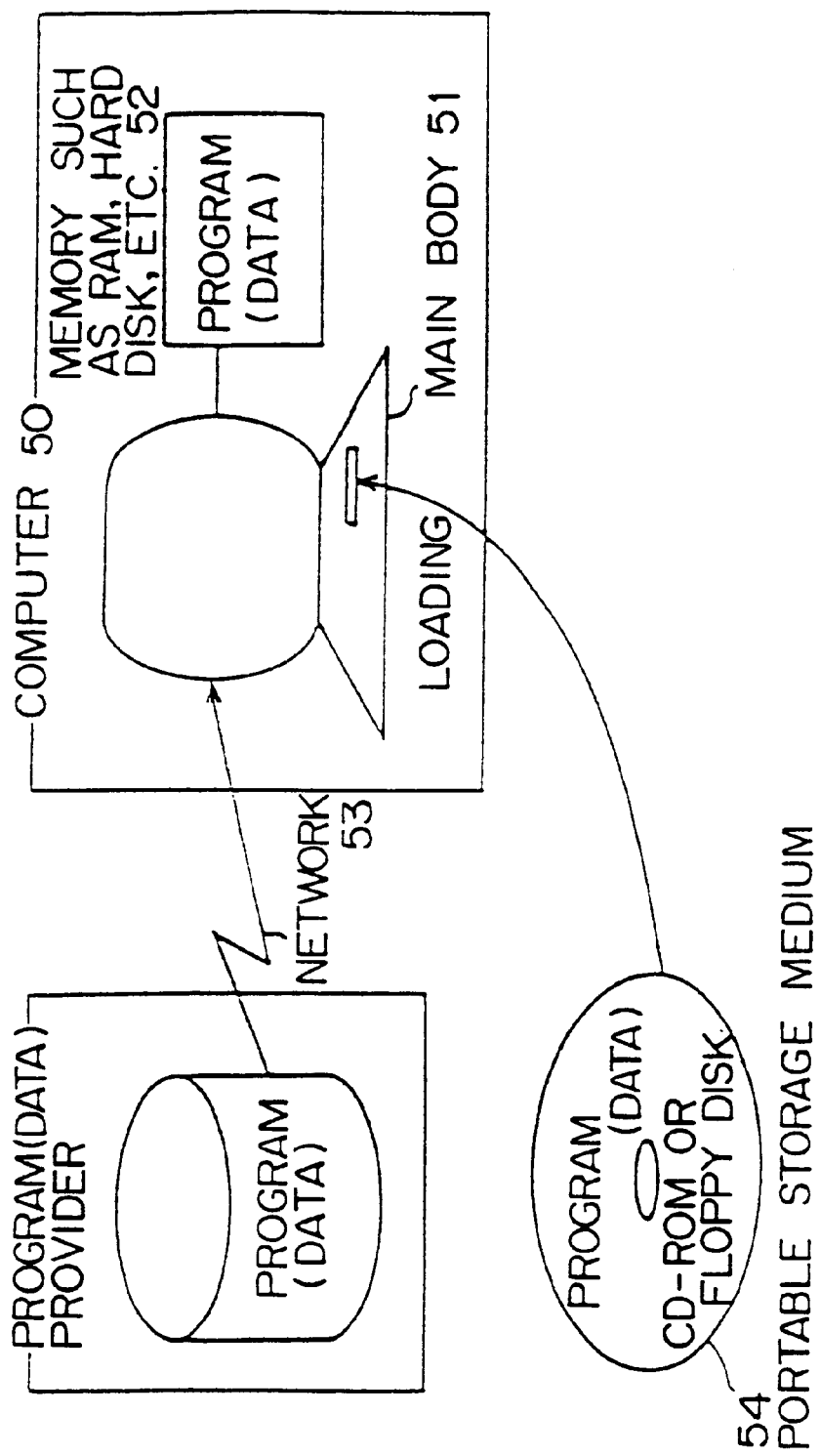
FIG. 17 is a schematic diagram explaining the process for loading a program for controlling storage operations into a computer.

Provided last are the explanations about the configuration of a computer system implementing the document image data storing and controlling system according to the present invention, and the process for loading a program intended for storing and controlling document image data from a storage medium in such a computer system, by referring to FIGS. 16 and 17.

FIG. 16 is a block diagram showing the configuration of a computer system for implementing the document image data storing and controlling system. In this figure, the computer system comprises a central processing unit (CPU) 42 for controlling the entire system; a memory 43 for storing bitmap data as document image data, document management information, etc.; a main storage 44 for temporarily storing a program for inputting/outputting data and a program for deleting and rewriting data, which are to be executed by the CPU 42; an input/output device 45 for inputting/outputting document image data, etc.; and a communication controlling device 46 for transmitting/receiving, for example, document image data to be input/output via a network.

FIG. 17 is a schematic diagram showing the process for loading the program for controlling the storage of document image data into a computer. In this figure, a computer 50 is composed of a main body 51 and a memory 52. To the main body 51, a program, etc. may be loaded from a portable storage medium 54, or from a program provider side via a network 53.

The program recited in claim 13 of the present invention or the program represented by the flowcharts of FIGS. 9 and 13 is stored, for example, in the memory 52 shown in FIG. 17, and executed by the main body 51. For example, a random access memory (RAM), a hard disk, etc. may be used as the memory 52.

Furthermore, the program for deleting partial image data in stages or the program for lowering the resolution of partial image data, etc. may be stored on the portable storage medium 54. Loading such programs into the computer 50 may allow the storage and controlling of document image data. As the portable storage medium 54, an arbitrary storage medium such as a memory card, a floppy disk, a CD-ROM (Compact Disk-Read Only Memory), an optical disk, a magneto-optical disk, etc. which are marketed and distributable, can be used. Additionally, the program for rewriting the document image data, etc. is transmitted from a program provider side to the computer 50 via the network 53, and loaded, so that the storage and controlling of document image data can be implemented.

As described above in detail, with the document image data storing a controlling system for use in a portable device whose storage amount is small, a rewrite process for reducing the amount of document image data in stages is performed, so that a storage area for storing new data can be secured without deleting the entire document image data at one time, while leaving effective information in a document image, according to the present invention. As a result, the storage area can be automatically secured and at the same time, information can be effectively used for a long period of time.

That is, according to the present invention, document image data is handled as a set of partial image data into which a bitmap image on a page is divided, and the management information corresponding to the bitmap image. When the document image data is deleted, the amount of partial image data is reduced in stages, and the management information is rewritten. In this way, more of the effective partial image data is left, for example, than in the case where the document image data is deleted in a page unit, so that a storage amount can be secured while leaving important information in a document image, which greatly contributes to making portable information devices more practical.

What is claimed is:

1. A document image data storing and controlling system comprising:

a document image data storing unit to store document image data which is structurized into partial image data;

a document image data rewriting unit to rewrite the document image data stored in said document image data storing unit in order to reduce an amount of the partial image data forming the document image data; and a document image data amount managing unit to manage the amount of data stored in said document image data storing unit, wherein said document image data amount managing unit issues an instruction for reducing the amount of data to said document image data rewriting unit when the amount of data stored in said document image data storing unit reaches a predetermined value, wherein said document image data storing unit stores management information corresponding to the document image data in addition to the document image data structurized into the partial image data, wherein said document image data storing and controlling system further comprises a document image data management information deleting unit for deleting the management information corresponding to the document image data stored in said document image data storing unit, and wherein said document image data amount managing unit issues an instruction for deleting the management information to said document image data management information deleting unit when said document image data amount managing unit determines that all pieces of the partial image data stored in said document image data storing unit are deleted.

2. A document image data storing and controlling method comprising the steps of:

storing document image data structurizing into partial image data in a storage apparatus; and rewriting the document image data stored in the storage apparatus in order to reduce an amount of the partial image data forming the document image data when the amount of the document image data stored in the storage apparatus reaches a predetermined value; and managing the amount of the document image data stored in the step of storing the document image data immediately before the step of rewriting the document image data, wherein the step of managing the amount of the document image data issues an instruction for reducing the amount of data to the step of rewriting the document image data, when the amount of data stored in the step of storing the document image data reaches the predetermined value, wherein the step of storing the document image data further comprises the step of storing management information corresponding to the document image data, and wherein the step of managing the amount of the document image data further comprises the step of deleting the management information stored in the step of storing the management information corresponding to the document image data according to the instruction issued by the step of managing the amount of the document image data, when all pieces of the partial image data stored in the step of storing the document image data are determined to be deleted, after the step of managing the amount of the document image data.

* * * * *